Jan. 6, 1942.  F. W. SCHARF  2,268,675
ELECTRIC TOASTER
Filed July 12, 1940  4 Sheets-Sheet 1
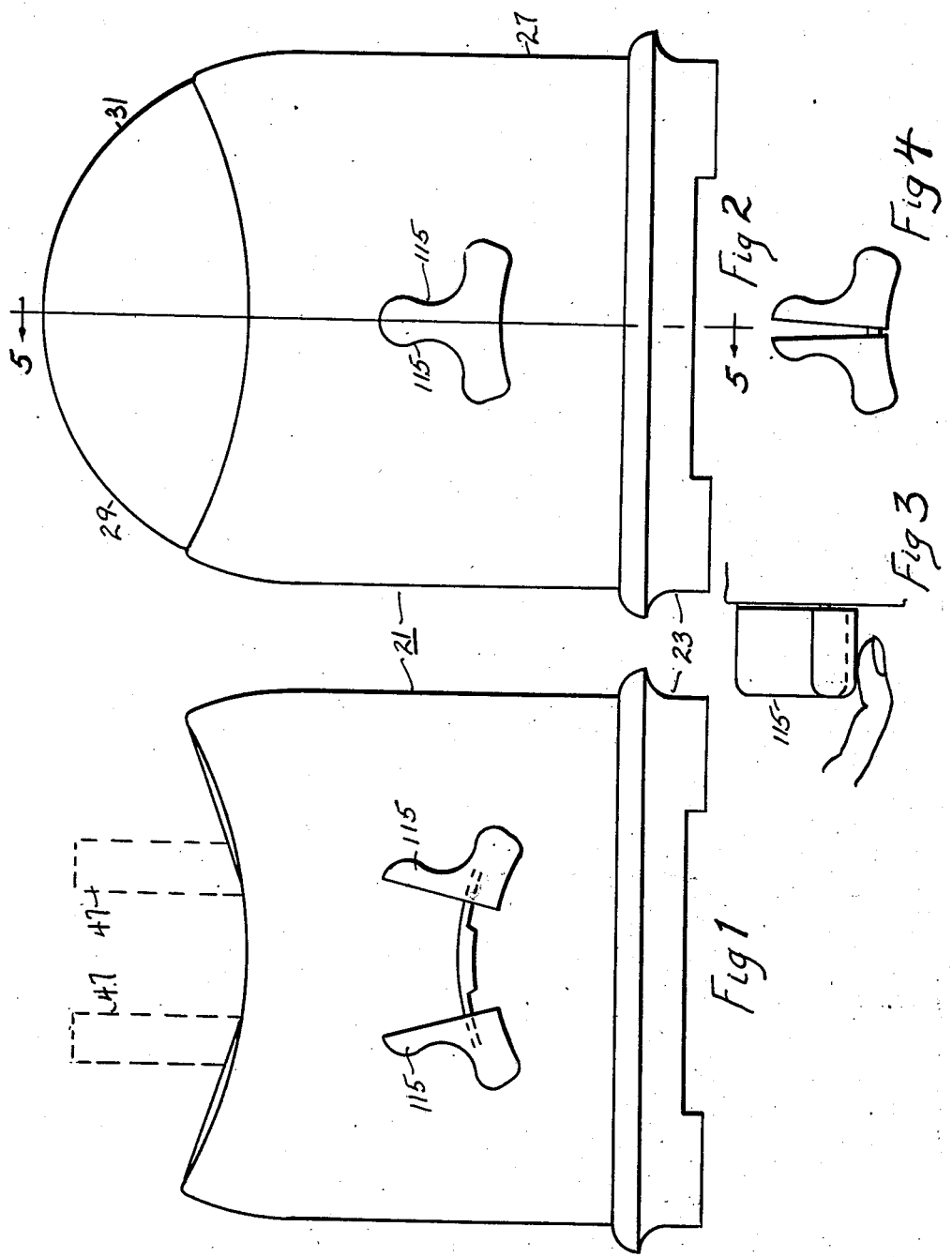
INVENTOR
Frank W. Scharf
BY
ATTORNEY

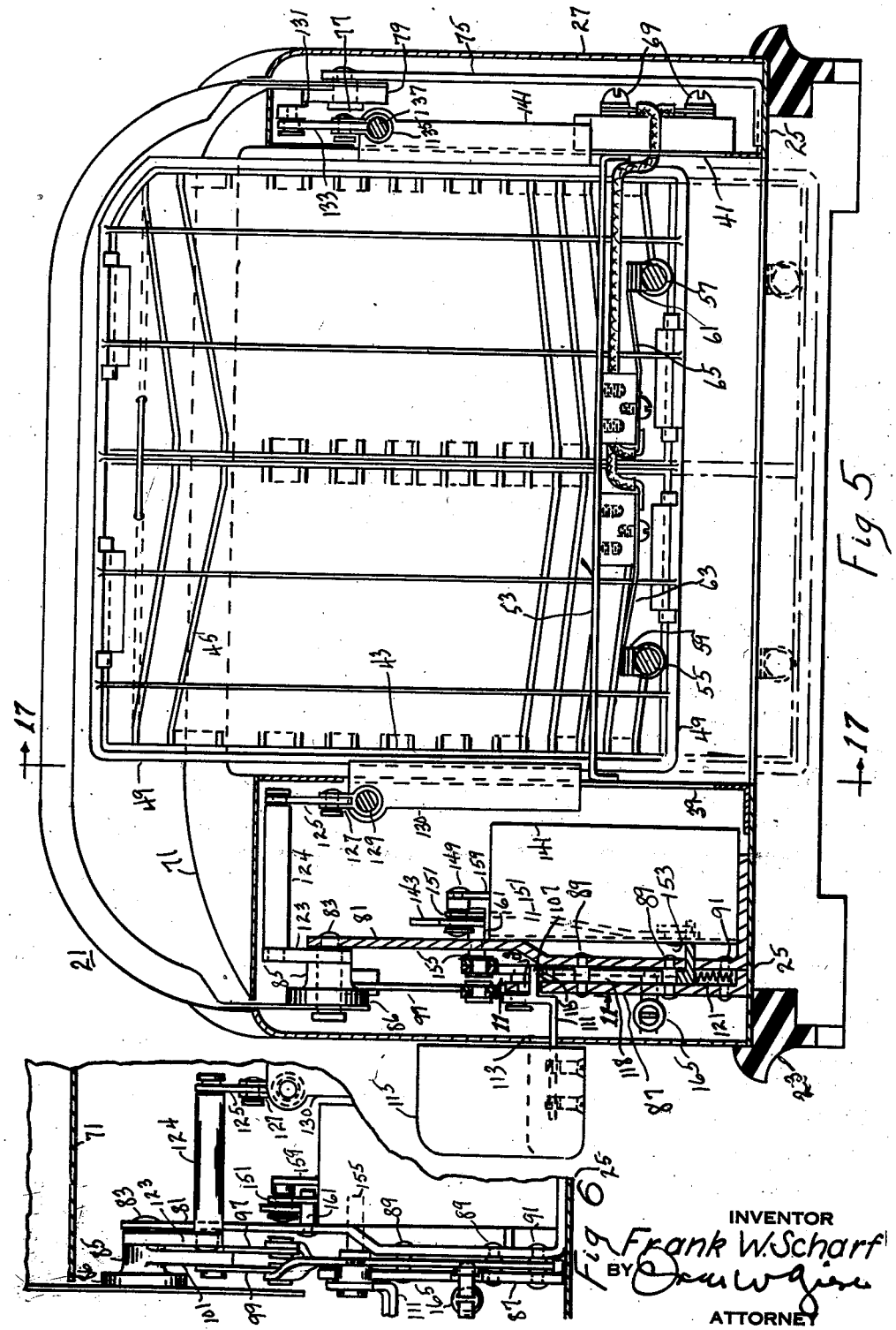

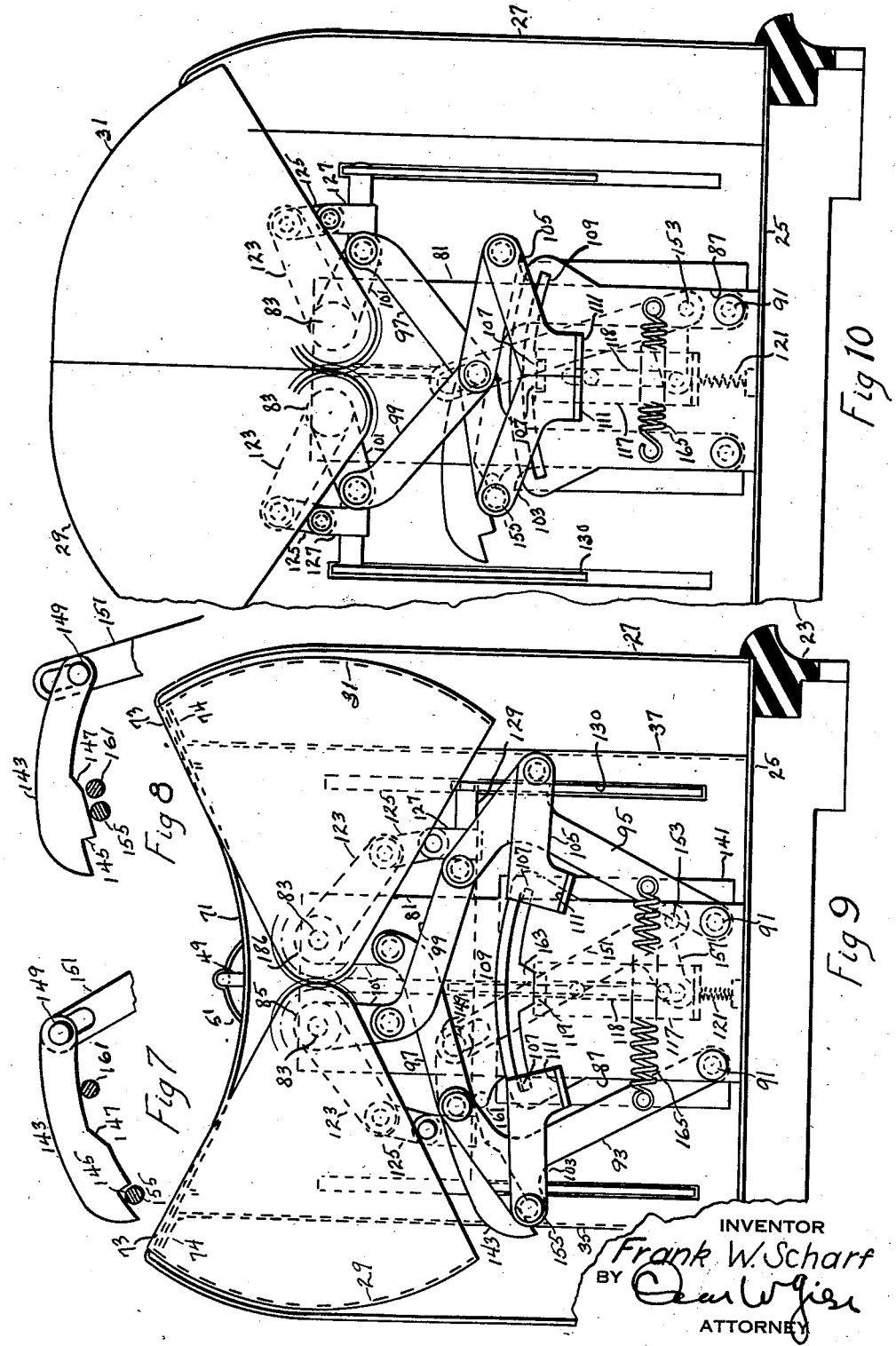

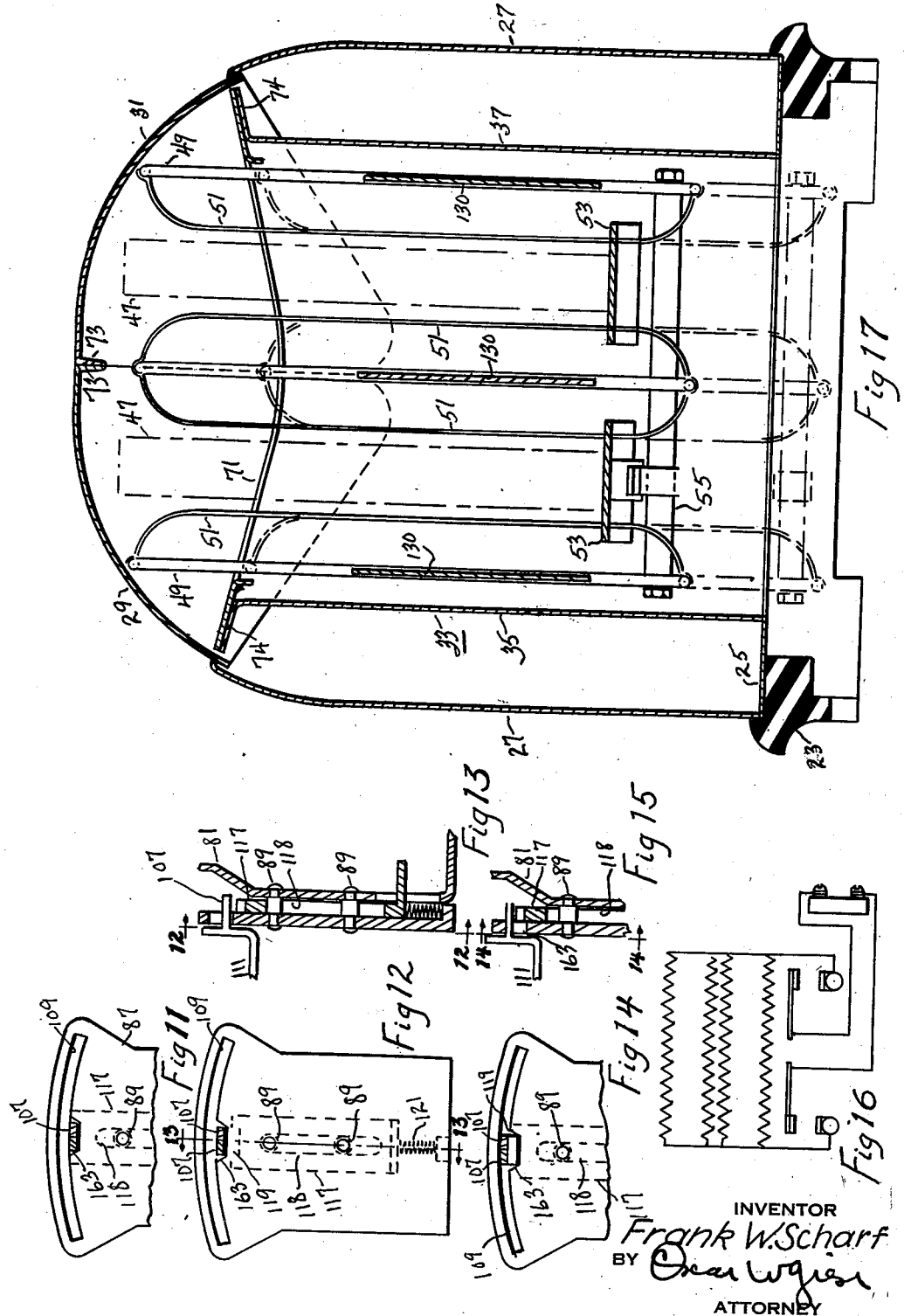

Patented Jan. 6, 1942

2,268,675

UNITED STATES PATENT OFFICE 2,268,675

ELECTRIC TOASTER

Frank W. Scharf, Marshall, Mich., assignor to McGraw Electric Company, Elgin, Ill., a corporation of Delaware Application July 12, 1940, Serial No. 345,191

6 Claims. (Cl. 219—19)

My invention relates to electric toasters.

An object of my invention is to provide a relatively simple casing structure for an electric toaster.

Another object of my invention is to provide a toaster assembly so constructed that a slice of bread can easily be inserted in and removed from the toasting chamber without danger of engaging heated parts of the toaster.

Another object of my invention is to provide a toaster which can be completely closed during a toasting operation.

Another object of my invention is to provide an electric toaster in which the slice of bread being toasted remains stationary and in which the normally deenergized heating elements are moved into toasting and energized position.

Still another object of my invention is to provide a toaster having normally open cooperating arcuate cover members and relatively simple means to move them to closed position.

Other objects will either be apparent from a description of a preferred form of toaster embodying my invention or will be pointed out hereinafter in the course of such description and particularly in the appended claims.

In the drawings,

Figure 1 is a view in front elevation, of a toaster embodying my invention with parts shown in inoperative or non-toasting position;

Figure 2 is a front elevational view with parts shown in operative position;

Figure 3 is a fragmentary view, in side elevation, showing the method of manually terminating a toasting operation;

Figure 4 is a front elevational view of actuating knobs shown in manually actuated releasing position;

Figure 5 is a view in vertical longitudinal section through a toaster embodying my invention taken on the line 5—5 of Figure 2, parts being shown in operating positions;

Figure 6 is a fragmentary view mainly in side elevation of the mechanism for controlling the bread carriers, the parts being shown in inoperative positions;

Figures 7 and 8 are fragmentary views, in front elevation, of certain parts of the carrier-actuating mechanism, shown in two different positions;

Figure 9 is a view in front elevation with the front portion of the casing removed and showing the actuating parts in non-toasting positions;

Figure 10 is a view similar to that shown in Figure 6 but with the parts shown in toasting position;

Figure 11 is a fragmentary view taken on the line 11—11 of Figure 5 and showing the detent in operating position;

Figure 12 is a fragmentary view similar to Figure 11 taken on the line 12—12 of Figure 13;

Figure 13 is a vertical sectional view through the parts shown in Figure 12 and taken on the line 13—13 of Figure 12;

Figure 14 is a fragmentary view taken on the line 14—14 of Figure 12 showing the detent and latches when manually released;

Figure 15 is a vertical sectional view through the parts shown in Figure 14;

Figure 16 is a diagram of the electrical connections, and

Figure 17 is a view in vertical lateral section taken on the line 17—17 of Figure 5.

An electric toaster assembly designated generally by numeral 21 may comprise a skeleton base frame 23 which may be made of a suitable moulded composition material, and which has mounted against its upper surface a bottom or base plate 25. The toaster assembly includes also a housing or outer casing 27 comprising front, rear and side walls secured in any suitable or desired manner against the upper surface of plate 25.

The outer casing includes in addition to the member 27, two arcuate cover portions 29 and 31 substantially similar in construction and of generally lune shape. The positions of members 29 and 31 when in open or inoperative positions is shown particularly in Figure 9 of the drawings while the operative or closed positions occupied by them during a toasting operation is shown in Figure 10 of the drawings. The two cover portions are actuated into and from their normal inoperative positions by means to be hereinafter described.

The toaster assembly includes an inner casing structure 33 comprising two side walls 35 and 37 extending between a front intermediate wall 39 and a rear intermediate wall 41 to provide the four vertical walls of a toasting chamber adapted to receive slices of bread to be toasted therein.

Toast heating means include a plurality of electric heating elements each of which includes one or more thin sheets 43 of electric-insulating material such as mica, having wound thereon electric resistor wire or strip 45 in a manner well known in the art. It will be noted from Figure 17 of the drawings that I have illustrated a two-slice toaster adapted to toast two slices of bread 47 at the same time and while I do not desire to be limited to three spaced heating elements, I have shown three such heating elements in which each of the one or several thin plates 43 are held in a metal frame 49. Guard wires 51 are provided on the inside of the outside heating units as shown in Figure 17 while the intermediate heating unit may have guard wires mounted thereon at both sides of the unit so that two slices of bread will be held in substantially centered position between the spaced apart heating elements. Means for supporting slices of bread during a toasting operation may include platforms 53 of any suitable or desired kind, which platforms may be supported by end portions secured to the front and the rear intermediate walls.

A pair of cross bars 55 and 57 are suitably mechanically connected with the lower end portions of the plurality of spaced heating units in order to maintain these heating units in proper operative and vertically-spaced positions and one end of the toast heating resistor hereinbefore described is connected to a contact terminal 59 mounted on bar 55 while the other end of the toast heating resistor is connected to a contact terminal 61 mounted on rod 57. It is, of course, obvious that if terminals 59 and 61 are not insulated from rods 55 and 57, these rods must be insulated from any mechanical parts of the toast heating means or if it is desired that the rods 55 and 57 have terminals 59 and 61 insulatedly mounted thereon, it is possible to have these rods engage some of the mechanical parts of the toast heating means which will, of course, permit a somewhat stiffer or more rigid structure.

Means engageable by the the contact members 59 and 61 under operating conditions comprise a spring supported contact member 63 and a spring supported contact member 65 (see Figure 5) suitably supported from the bread support 53 within the toasting chamber, these two spring supported contacts being connected to two terminals 69 of the toaster by suitably insulated electrical conductors. It is of course understood that the terminals 69 are to be connected through a twin conductor supply circuit cord to a suitable source of electrical energy in a manner well known in the art. As will be hereinafter set forth, the toast heating means is adapted to move vertically from the position shown by the broken lines in Figure 17 when the heating means is not energized to the position shown by the full lines in Figure 17 when the contact members 59 and 61 will be in engagement with spring contact members 63 and 65 to permit of energizing the toast heating means to effect toasting of slices of bread positioned on the carrier platforms 53.

A top closure plate 71 of generally rectangular form is provided, the side portions of which fit under the inturned flanged portions 73 of the upper edges of the covers 29 and 31 when these covers are in their open position, and engage and rest on out-turned flanges 74 at the upper ends of the side walls 35 and 37. In general, this top plate 71 serves not only as a cover member but also in general as a finish strip. It will be noted that the lower edges of cover portions 29 and 31 move inside of the upper edge portions of the outer casing 27.

Means for supporting the cover portions may include a rear vertically-extending bracket plate 75 having a lower end portion secured to the bottom plate 25 at its rear edge and extending substantially vertically upwardly at the inside of the rear wall of casing 27. Two spaced pivot pins or stub shafts 77 are fixedly mounted in the upper end of bracket 75 and are severally adapted to support hubs 79 fixedly secured to the narrow rear end of each of the cover portions to permit of the hereinbefore described arcuate movement of the cover portions toward and away from each other.

At the front end of the toaster assembly there is provided a front bracket plate 81 of substantially L-shape having its lower end portion resting on and secured to bottom plate 25 (see Figure 5). The bracket 81 is provided with two spaced pins or stub shafts 83 on which are mounted hubs 85 to which are respectively secured the front narrow ends of the respective cover portions 29 and 31. The hubs 85 may include meshing segmental gear portions 86 shown in Figures 5, 6, 9 and 10, whereby to cause the two cover portions to move simultaneously with each other.

In addition to the relatively long bracket 81 I provide a second front bracket 87 which is substantially shorter than bracket 81 and is secured to bracket 81, spaced therefrom a suitable distance, by rivets 89 as well as by rivets 91.

A pair of substantially similar lever arms 93 and 95 are pivotally mounted on the rivets or pins 91 and are of what might be termed distorted T-shape, as will be seen most clearly by reference to Figure 9 of the drawings. The upper ends of each of the cross arms of lever arms 93 and 95 are pivotally connected to the lower ends of crossed links 97 and 99, which are of slightly L-shape (as will be seen by reference to Figure 9) the upper ends of which are connected to the lower ends of a pair of link arms 101, the upper ends of which are respectively fixedly connected with the hubs 85 hereinbefore described as being mounted on the respective stub shafts 83. The construction and arrangement of the lever arms 93 and 95, the links 97 and 99 and the link arms 101 is such that when the two lever arms 93 and 95 are subjected to contracting pressure to cause them to move toward each other, the cover portions will be moved from their open positions as seen in Figure 9 to their closed positions as seen in Figure 10.

Means for effecting this movement of the lever arms 93 and 95 to cause closing movement of the cover portions may include a pair of links 103 and 105, each of substantially L-shape positioned in front of bracket 87. The outer end of the longer arm of each link is pivotally connected to the lower end of the cross arm of lever arms 93 and 95 and a rearwardly projecting lug or extension 107 is provided at the other end of the respective longer arms of links 103 and 105. These lugs or extensions 107 are adapted to move in an arcuate slot 109 provided in the upper end of bracket 87, and support the inner adjacent ends of links 103 and 105. Links 103 and 105 are individually provided with forwardly extending portions 111 which projections extend through a slot 113 in the front wall of the casing 27. An actuating knob 115 is mounted on each of the respective projections 111 and these knobs may be of the general shape shown in Figures 1 and 2 to be easily grasped by an operator to move the same toward each other when it is desired to initiate a toasting operation.

A detent 117 is vertically slidable on the pins or rivets 89 having an elongated slot 118 and is of substantially bar shape and provided with a rectangular recess 119 in its upper end face. The extensions 107 are adapted to fit into this recess 119 under normal operating conditions of the toaster when the detent 119 is permitted to move to its operative position by a spring 121 which tends to bias the detent to its uppermost position where it can engage with and hold the extensions 107 which therefore act as latches to hold the cover portions in their engaging positions as shown in Figure 10 of the drawings.

It is desired to move the toast heating means vertically upwardly from the position shown in broken lines in Figure 5 to the position shown by the full lines in Figure 5 and for this purpose I provide a pair of link arms 123 at the front of the toaster fixedly secured to the hub members 85, these two arms extending away from each other and angularly downwardly when the cover portions are open, as will be seen in Figure 9 of the drawings. Each of the arms 123 has fixedly secured thereto at its outer end a rod 124 extending backwardly to the upper end of a link 125 pivotally connected thereto, the lower ends of these links being pivotally connected to bracket members 127, which support a cross bar 129 operatively connected through bars or plates 130 with the toast heating means hereinbefore described. At the rear end of the toaster I provide a pair of link arms 131 each fixedly secured to the hubs 79 and pivotally connect with each link arm a link 133 which links are connected to brackets 135 carrying a cross bar 137 connected to the rear end of the toast heating means through bars or plates 141. The rear linkage is substantially the same as that hereinbefore described for the front end of the toaster as supporting the toast heating means and the two will operate together. If desired the hubs 79 may be provided with cooperating segmental gears to assure simultaneous movement of all of these members.

In order to provide an automatic termination of a toasting operation after a predetermined time, I provide a mechanical timer assembly 141 which may be of any suitable or desired kind but since it constitutes no part of my present invention, is shown generally only. It will, however, be understood that it includes suitable spring means, a gear train and a suitable retarding means so that the spring may be wound up at the beginning of a toasting operation and be permitted to unwind against the delaying effect of the gear train and the retarding means, all in a manner now well known in the art. I may use a modified form of the timer shown in Ireland Patent Number 1,866,808 assigned to the same assignee as is the present invention.

Means for energizing the mechanical timer 141 may include an arm 143 having a shouldered recess 145 at its free end (see Figures 7 and 8) and also provided with a cam surface 147 at its lower edge intermediate its ends. The arm 143 has rigidly secured thereto a pin 149 which may move in the upper slotted end of a lever arm 151, the lower end of this lever arm being pivotally mounted on a pin 153 in a suitable part of the timer structure. When the actuating members hereinbefore described are in their normal or inoperative positions as seen in Figure 9 of the drawings, the shoulder 145 of arm 143 rests upon a pin 155 which is mounted on lever arm 93 at the lower end of the cross bar constituting a part thereof. It is, therefore, obvious that when lever arm 93 is moved in clockwise direction, the arm 143 will be moved to the right (as seen in Figure 9) and will cause a clockwise turning movement of lever arm 151. Adjacent its lower end the arm 151 is provided with a lateral extension 157 adapted to bear upon and depress detent 117 against the biasing pressure of spring 121.

The stud or pin 149 has pivotally mounted thereon the upper end of a timer winding arm 159 which is connected in any suitable or desired manner with the spring arbor usually used in mechanical timers. The construction of the timer is such that when arm 143, lever arm 151 and therefore winding arm 159 are moved to the right or in a clockwise direction attendant upon turning movement of arm 93, the timer will be wound up to a predetermined degree.

Reference to Figures 7 and 8 of the drawings will show that the right-hand end portion of arm 143 normally rests upon a pin 161 fixedly mounted in and supported by bracket 81. When pin 161 engages the cam surface 147, the left-hand end of arm 143 will be moved upwardly so that pin 155 will be moved out of the recess 145 thereby stopping winding of the timer and permitting the spring of the timer to unwind, all in a manner well known in the art.

The arcuate slot 109 in bracket 87 is provided with a central depending recess 163, the side walls of which are angularly inclined so that when the latch portions 107 approach each other adjacent the vertical center line of the structure, they will be permitted to move downwardly and into the recess 119 in the upper end of detent 117, which detent has been permitted to move upwardly under the action of spring 121 because of the clockwise turning movement of extension 157, as hereinbefore set forth.

It is obvious that timer arm 159 and arm 151 which are fixedly mounted on stub shaft 149 are moved in a counter-clockwise direction (as seen in Figure 9) during the unwinding of the mechanical timer and that when arm 143 and arm 151 have been moved as far to the left as will cause downward movement of detent 117 into latch-disengaging position, the parts which during the toasting operation were in the positions shown in Figure 10 of the drawings will be quickly moved to inoperative positions as shown in Figure 9 of the drawings. In order to prevent undue mechanical noise when the two cover portions move into their inoperative positions, I may provide a tension spring 165 connected to the lever arms 93 and 95 as shown in Figures 9 and 10 of the drawings.

If it be desired to manually terminate a toasting operation at any time during its progress, this may be done by pressing upwardly against both knobs 115 as shown in Figure 3 of the drawings, the two knobs then moving upwardly and slightly apart as shown in Figure 4 of the drawings. When this movement is effected, the latches 107 will be moved upwardly as shown in Figures 14 and 15 of the drawings to move them out of the recess 119 in detent 117. It is obvious that when the toasting operation is terminated by action of the timer, the detent 117 is moved downwardly away from the latch members while the latch members are moved upwardly away from the detent when a toasting operation is terminated manually. It is further to be noted that both latch members 107 must be moved upwardly simultaneously by an operator in order to manually terminate a toasting operation since if only one latch member were moved upwardly the other latch member still remaining in the recess in the detent would hold all of the parts in their operative or toasting positions.

It will be noted that I have provided a toaster structure which is substantially enclosed during a toasting operation and in which slices of bread to be toasted are held in substantially fixed positions relatively to the major parts of the toaster structure and it is possible to so design the cover portions that the slices of bread will project a relatively large distance vertically above the upper parts of the toaster structures whereby possibility of accidental contact of an operator with heated parts of the toaster is substantially entirely precluded. Instead of moving the bread carriers relatively to the heating means, my improved structure moves the heating means relatively to the substantially fixed bread supports and pieces of bread supported thereby.

If it be desired to vary the toasting characteristics of the toaster I may provide ventilating means to produce a draft within the cooking chamber. The ventilating means may take any of a number of forms, as for example, openings within the base of the toaster and corresponding openings in the closable cover top. Or, instead of the openings at the top, I may provide for an incomplete closure of the arcuate cover members so as to leave an opening for air to circulate therethrough.

Various modifications may be made in the device embodying my invention without departing from the spirit and scope thereof and I desire therefore that all such modifications shall be considered as being covered by the appended claims.

I claim as my invention:

1. An electric toaster including a casing, a toast heater normally yieldingly biased to a lower inoperative position substantially within the casing and manually actuable means for moving the toast heater into an upper operative position with its upper portion positioned within the casing, said manually actuable means including two pivotally mounted lever arms normally spaced apart and movable toward each other to effect said movement, a lug on each lever arm and a detent member having a recess therein for receiving both said lugs to hold said toast heater in its upper operative position.

2. An electric toaster including a casing, a bread carrier fixedly positioned within the casing, a movable electric toast heater biased to a lower non-toasting position substantially within the casing, contact members on the heater movable therewith, cooperating contact members supported by the bread carrier and normally out of engagement with the contact members on the heater, manually actuable means including two pivotally mounted lever arms normally spaced apart and movable toward each other and a linkage connecting said lever arms to the toast heater for moving the heater to upper contact-engaging and toasting position, a lug on each lever arm and a detent member having a recess therein to receive both lugs to hold said toast heater in contact-engaging position.

3. An electric toaster including a casing, a bread carrier fixedly positioned within the casing, a movable electric toast heater biased to a lower non-toasting position substantially within the casing, contact members on the heater movable therewith, cooperating contact members supported by the bread carrier and normally out of engagement with the contact members on the heater, manually actuable means including two pivotally mounted lever arms normally spaced apart and movable toward each other and a linkage connecting said lever arms to the toast heater for moving the heater to upper contact-engaging and toasting position, a lug on each lever arm and a detent member having a recess therein to receive both lugs to hold said toast heater in contact-engaging position, said lever arms being releasable from said detent by upward movement of said lever arms.

4. An electric toaster including a casing, a bread carrier fixedly positioned within the casing, a movable electric toast heater biased to a lower non-toasting position substantially within the casing, contact members on the heater movable therewith, cooperating contact members supported by the bread carrier and normally out of engagement with the contact members on the heater, manually actuable means including two pivotally mounted lever arms normally spaced apart and movable toward each other and a linkage connecting said lever arms to the toast heater for moving the heater to upper contact-engaging and toasting position, a lug on each lever arm and a detent member having a recess therein to receive both lugs to hold said toast heater in contact-engaging position, release of said toast heater from its upper contact-engaging position requiring simultaneous movement of both of said lugs relatively to the detent.

5. An electric toaster including a casing a toast heater normally yieldingly biased to a lower inoperative position substantially within the casing and manually actuable means including a pair of pivotally mounted lever arms and links pivotally connecting the lever arms and requiring a contracting pressure by an operator to cause upward movement of the toast heater into operative position, a detent biased to operative position, means connected with one of said lever arms and actuable thereby for normally holding the detent in inoperative position, a pair of lugs pivotally connected with the lever arms and engageable with the detent for holding the toast heater in operative position.

6. A device as set forth in claim 5 in which manual release of the toast heater from operative position requires simultaneous movement of both lugs relatively to the detent.

FRANK W. SCHARF.